(12) United States Patent
Mizuno et al.

(10) Patent No.: US 7,878,530 B2
(45) Date of Patent: Feb. 1, 2011

(54) REAR-IMPACT AIRBAG APPARATUS

(75) Inventors: Yoshio Mizuno, Aichi-ken (JP); Takashi Iida, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 253 days.

(21) Appl. No.: 12/000,557

(22) Filed: Dec. 13, 2007

(65) Prior Publication Data

US 2008/0143084 A1   Jun. 19, 2008

(30) Foreign Application Priority Data

Dec. 15, 2006  (JP) .............................. 2006-338538

(51) Int. Cl.
*B60R 21/26* (2006.01)
(52) U.S. Cl. ............... 280/730.1; 280/730.2; 280/743.1
(58) Field of Classification Search .............. 280/730.1, 280/730.2, 743.1
See application file for complete search history.

(56) References Cited

U.S. PATENT DOCUMENTS

| 6,474,724 | B2 * | 11/2002 | Lemmon et al. | ....... 296/187.05 |
| 6,869,099 | B2 * | 3/2005 | Kawasaki et al. | ......... 280/730.2 |
| 2003/0116947 | A1 * | 6/2003 | Yokoyama et al. | ....... 280/730.2 |
| 2004/0066022 | A1 * | 4/2004 | Mori et al. | ............... 280/730.1 |
| 2004/0239084 | A1 * | 12/2004 | Mori et al. | ................ 280/730.1 |
| 2005/0062267 | A1 * | 3/2005 | Recker et al. | ............ 280/730.2 |
| 2006/0061071 | A1 * | 3/2006 | Noguchi et al. | .......... 280/730.2 |
| 2006/0097491 | A1 * | 5/2006 | Saberan et al. | ........... 280/730.1 |
| 2006/0138754 | A1 * | 6/2006 | Hirata et al. | ............. 280/730.1 |
| 2006/0214401 | A1 * | 9/2006 | Hirata | ..................... 280/730.1 |

FOREIGN PATENT DOCUMENTS

JP    A-2004-142481    5/2004

* cited by examiner

*Primary Examiner*—Toan C To
(74) *Attorney, Agent, or Firm*—Posz Law Group, PLC

(57) ABSTRACT

A rear-impact airbag apparatus for use in a vehicle has an inflator and an airbag accommodated in an accommodation portion formed in the roof of the vehicle. When supplied with gas from the inflator, the airbag pops out of the accommodation portion and is inflated and deployed. A lateral inflatable cell and a pair of left and right vertical inflatable cells are defined in the airbag. The lateral inflatable cell guides gas from the inflator to flow outward in the vehicle width direction. Each vertical inflatable cell guides gas flowing therein from a corresponding end of the lateral inflatable cell to flow substantially downward. The gas flowing path cross-sectional area of a boundary between the lateral inflatable cell and each vertical inflatable cell is larger than the gas flowing path cross-sectional area of the lateral inflatable cell. This permits gas to smoothly flow through the boundaries between the lateral inflatable cell and the vertical inflatable cells, at which the gas flowing direction is greatly changed.

3 Claims, 9 Drawing Sheets

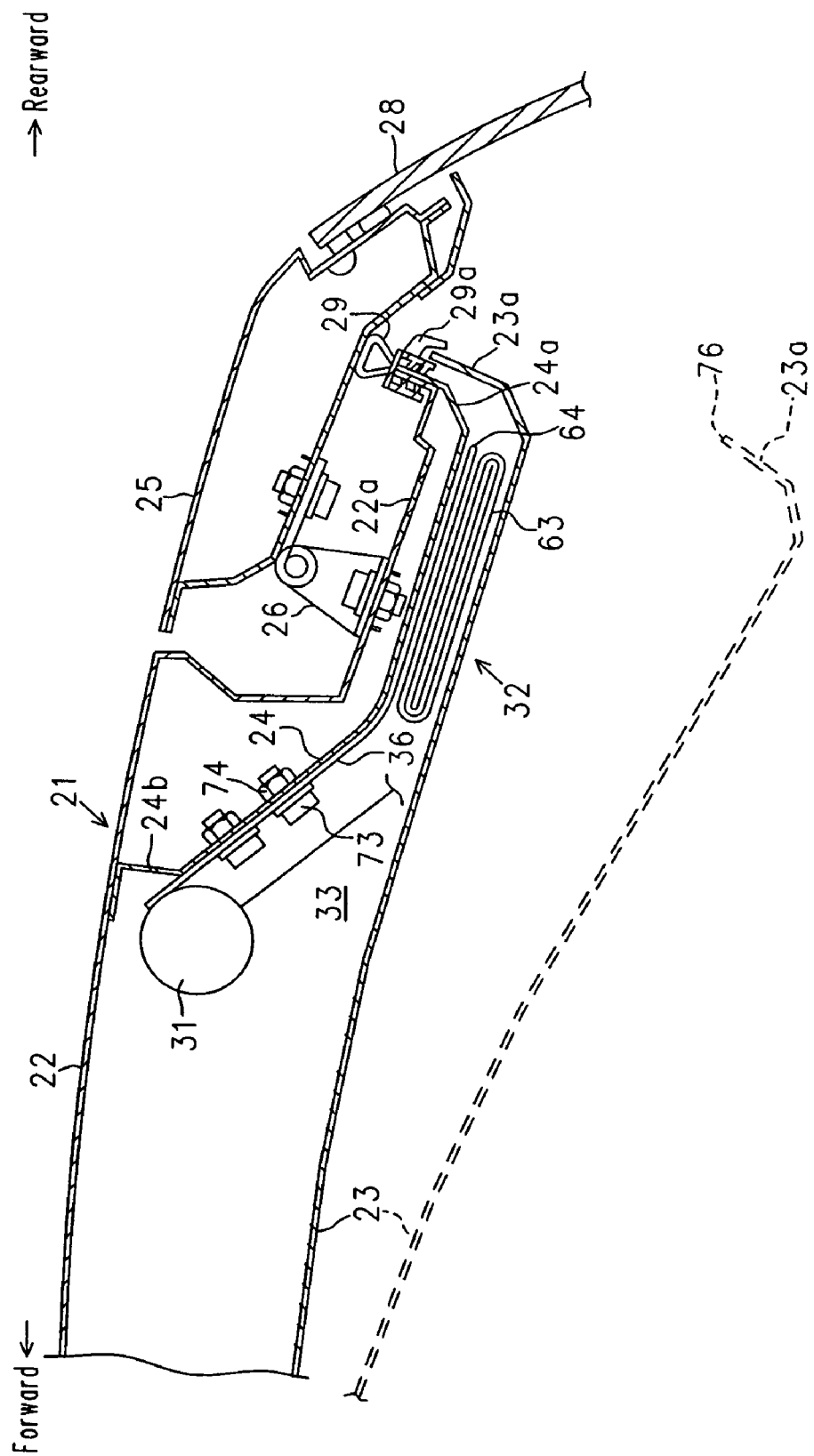

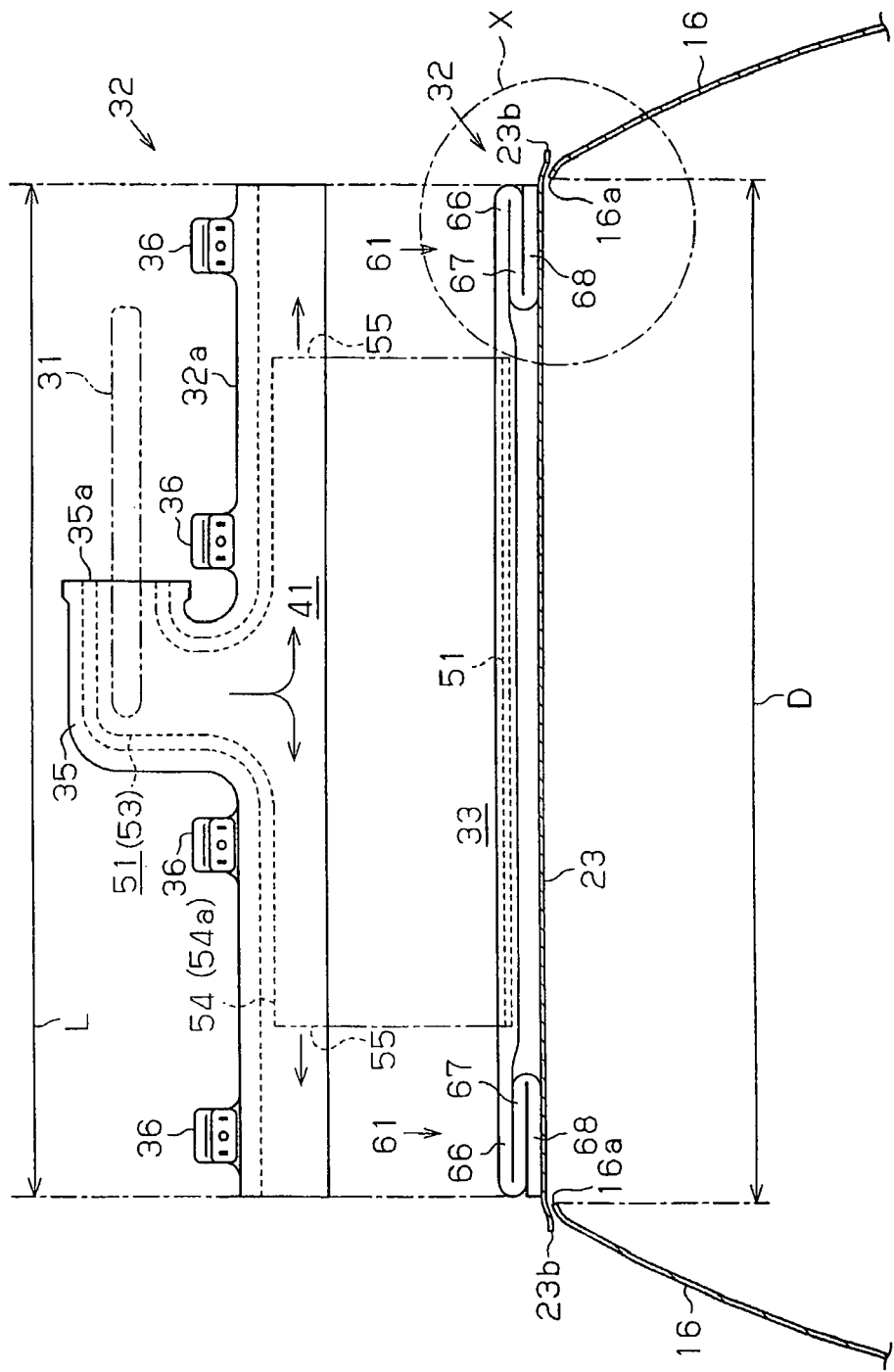

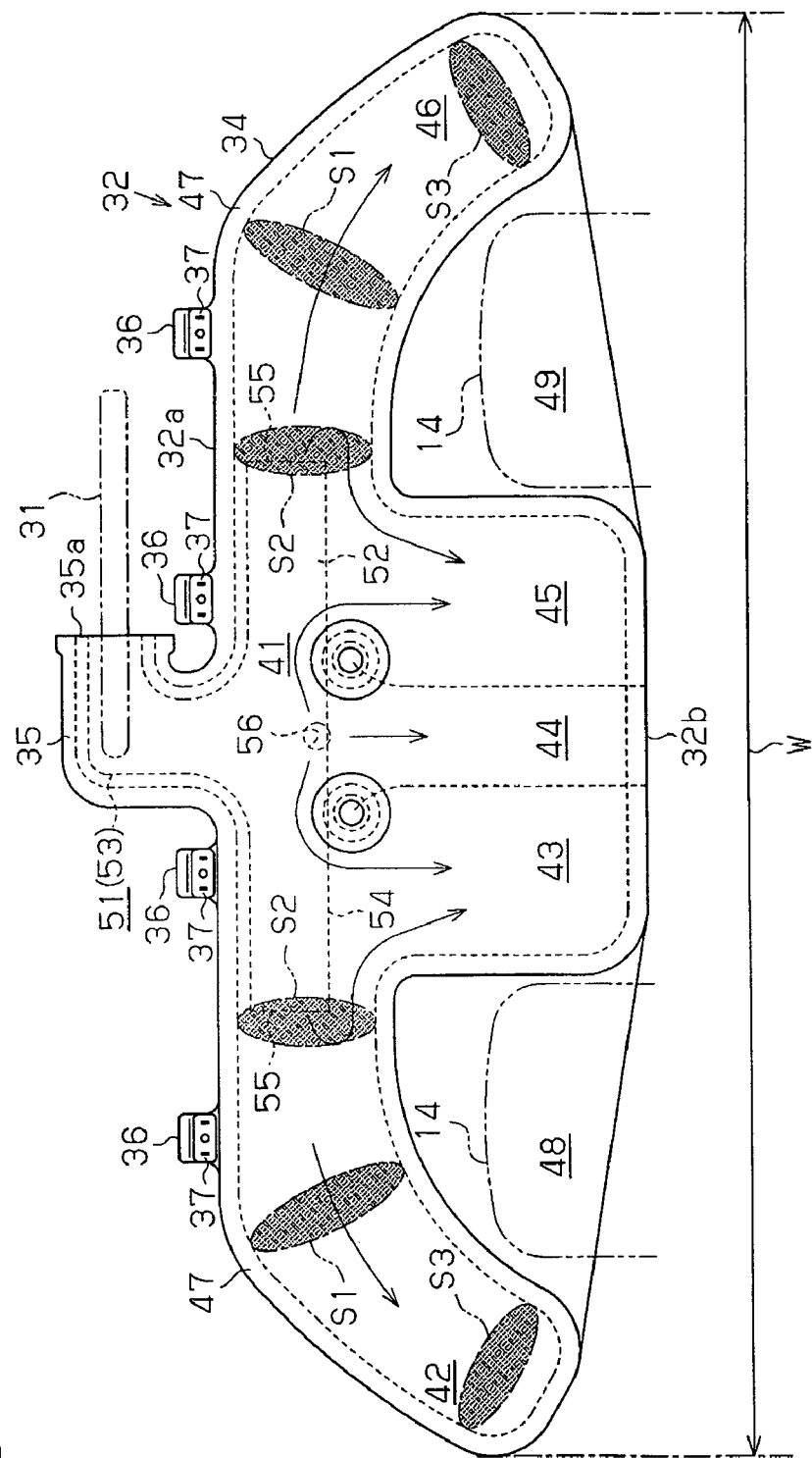

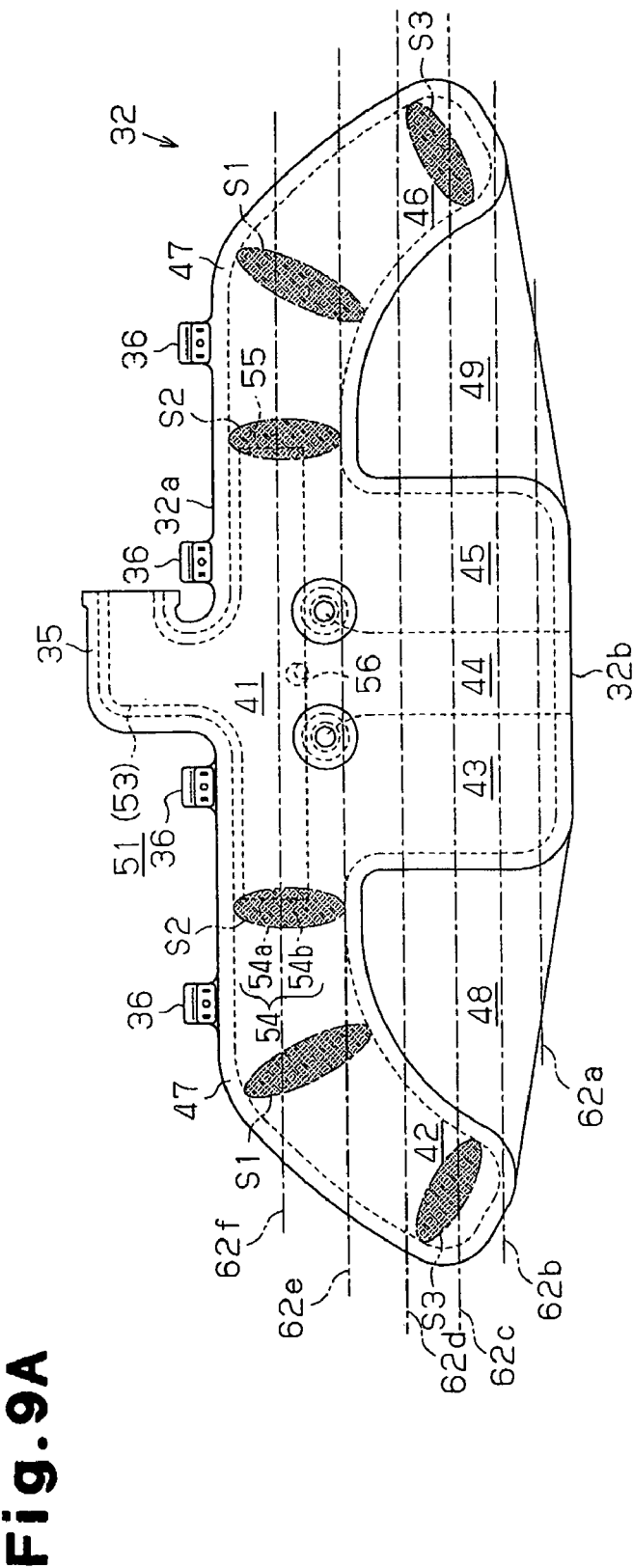
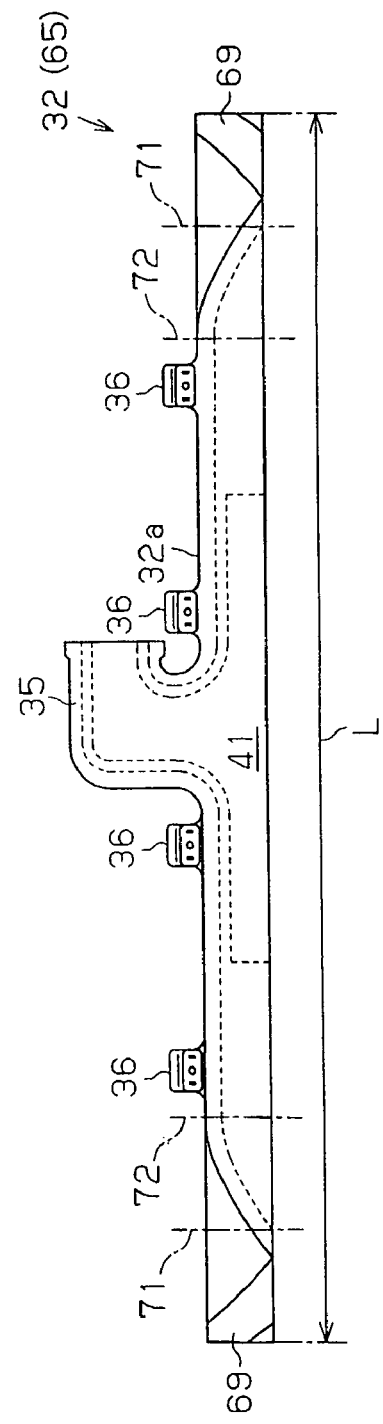

Leftward ← → Rightward

REAR-IMPACT AIRBAG APPARATUS

BACKGROUND OF THE INVENTION

The present invention relates to a rear-impact airbag apparatus having an airbag that is inflated and deployed to protect an occupant in response to a rear impact applied to a vehicle.

Like other types of airbag apparatus, the rear-impact airbag apparatus has an inflator and an airbag. The airbag of the rear-impact airbag apparatus is folded and accommodated in an accommodation portion formed in a rear part of the roof. When an impact is applied to the vehicle from the rear, the inflator is activated and ejects gas. Being supplied with gas from the inflator, the airbag is inflated and deployed along the rear window from the accommodation portion. The inflated and deployed airbag protects an occupant seated on the rear seat from the rear impact applied to the vehicle.

A typical rear-impact airbag apparatus is disclosed, for example, in Japanese Laid-Open Patent Publication No. 2004-142481. The rear-impact airbag apparatus of the publication has a lateral inflatable cell and a pair of left and right vertical inflatable cells, which are defined in the airbag. The lateral inflatable cell guides gas to flow outward from an inflator along the vehicle width direction. The vertical inflatable cells each guide gas flowing therein to flow substantially downward from the corresponding end of the lateral inflatable cell. Additional vertical inflatable cells are defined in the airbag. In the inflated and deployed airbag, the additional vertical inflatable cells are located below the lateral inflatable cell and between the left and right vertical inflatable cells. Each inflatable cell is inflated in such a manner that its upper portion has a greater thickness than its lower portion. This configuration effectively improves the occupant protecting performance from a rear impact applied to the vehicle without significantly increasing the inflation amount of the entire airbag.

In the rear-impact airbag apparatus of the above publication, gas that is ejected from the inflator in response to a rear impact applied to the vehicle first flows into the lateral inflatable cell. Then, some of the gas passes through the lateral inflatable cell and flows into the left and right vertical inflatable cells. That is, part of the gas from inflator is guided outward in the vehicle width direction by the lateral inflatable cell, and thereafter, guided substantially downward by the left and right vertical inflatable cells. Thus, the direction of the gas flow is greatly changed at the boundary between the lateral inflatable cell and each of the left and right vertical inflatable cells. Due to an increased flow resistance of the gas, gas cannot smoothly flow through the positions where such a great change in the gas flowing direction takes place. If a smooth gas flow is hampered in this manner, the inflation and deployment of part of the airbag can be delayed, resulting in an uneven inflation and deployment of the airbag.

SUMMARY OF THE INVENTION

Accordingly, it is an objective of the present invention to provide a rear-impact airbag apparatus that allows gas to smoothly flow at a boundary between a lateral inflatable cell and a vertical inflatable cell, where gas flowing direction is greatly changed.

To achieve the foregoing objective and in accordance with one aspect of the present invention, a rear-impact airbag apparatus for use in a vehicle is provided. The apparatus includes an inflator that ejects gas in response to an impact applied to the vehicle from the rear, and an airbag accommodated in an accommodation portion formed in a rear portion of a roof of the vehicle. When supplied with gas from the inflator, the airbag pops out of the accommodation portion and is inflated and deployed. A lateral inflatable cell, which guides gas from the inflator to flow outward in a width direction of the vehicle, and a vertical inflatable cell, which guides gas flowing therein from an end of the lateral inflatable cell to flow substantially downward, are defined in the airbag. A gas flowing path cross-sectional area of a boundary between the lateral inflatable cell and the vertical inflatable cell is larger than a gas flowing path cross-sectional area of the lateral inflatable cell.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 6 is a cross-sectional side view showing a rear portion of the roof of the vehicle shown in FIG. 1;

FIG. 7A is a plan view illustrating an airbag, which is folded into a shape for accommodation;

FIG. 7B is a diagrammatic view showing the positional relationship between the airbag, which is folded into the shape for accommodation, and left and right rear pillar garnishes;

FIG. 8 is a front view showing an unfolded airbag;

FIG. 9A is a front view of the unfolded airbag, showing fold lines defined on the airbag;

FIG. 9B is a front view showing a folded intermediate body of the airbag;

DETAILED DESCRIPTION OF THE PREFERRED EMBODIMENTS

One embodiment of the present invention will now be described with reference to the drawings. A rear-impact airbag apparatus according to the present embodiment is installed and used in a vehicle 10. In the following, the traveling direction of the vehicle 10 is defined as a forward direction. With reference to the forward direction, front and rear, up and down, and left and right directions are defined.

Figure 1:
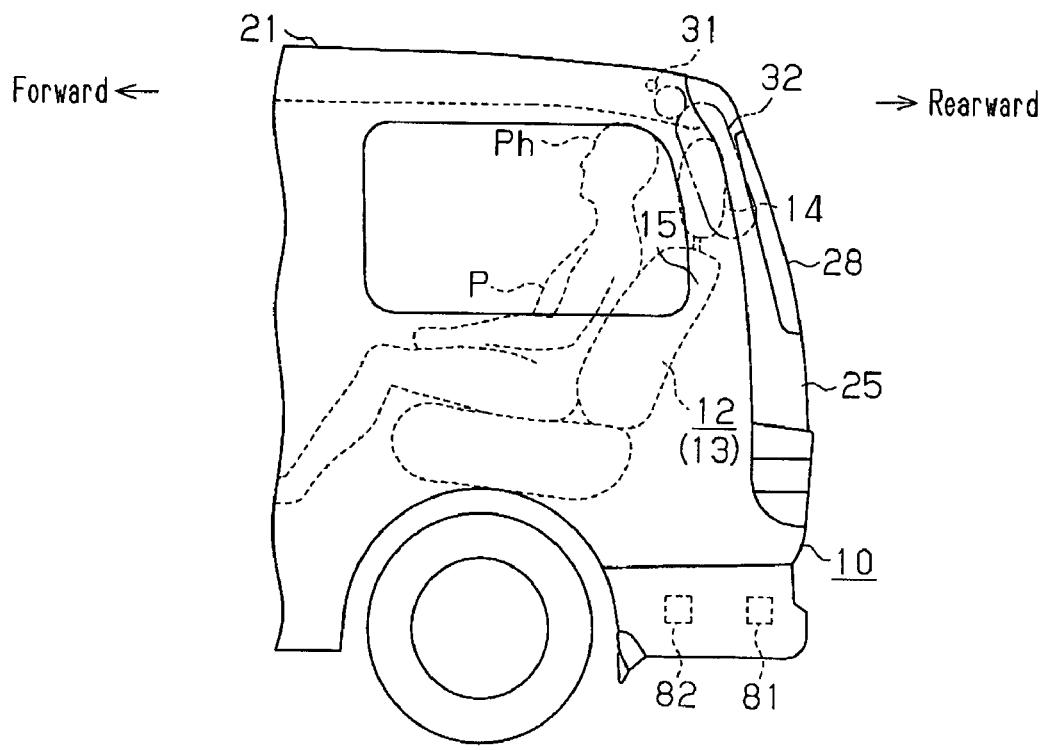
FIG. 1 is a side view illustrating a rear portion of a vehicle in which a rear-impact airbag apparatus according to one embodiment of the present invention is installed.
Figure 2:
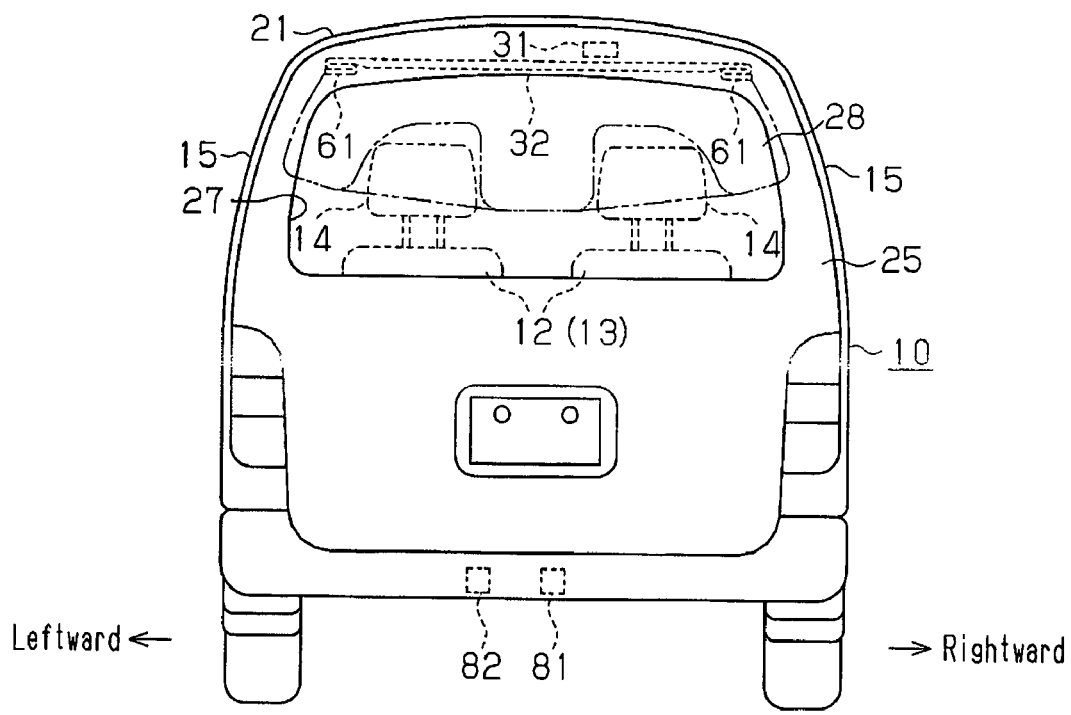
FIG. 2 is a rear view showing the vehicle shown in FIG. 1.
Figure 3:
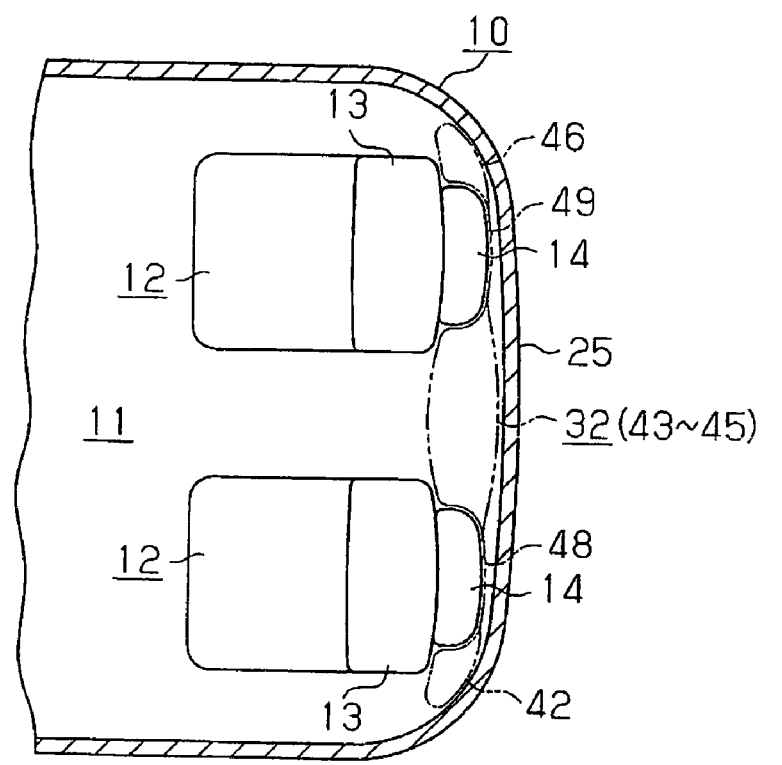
FIG. 3 is a diagrammatic cross-sectional plan view of the rear portion of the vehicle of FIG. 1, showing the positional relationship between the rear seat and an inflated and deployed airbag.

First, the structure of a rear portion of the vehicle 10, which includes a section in which the rear-impact airbag apparatus is installed, will be described. As shown in FIGS. 1 to 3, a pair of left and right rear seats 12, which are rearmost seats, are arranged in a rear portion of a passenger compartment 11 of the vehicle 10. Each rear seat 12 has a backrest 13 and a headrest 14, which is attached to the top of the backrest 13 to support the head Ph of an occupant P.

A rear pillar (C-pillar) extending substantially vertically is provided in each of the left and rear sides of the rear portion of the vehicle 10. The rear pillars 15 are tilted in such a manner that the distance between the pillars 15 increases from the upper ends to the lower ends.

Figure 4:
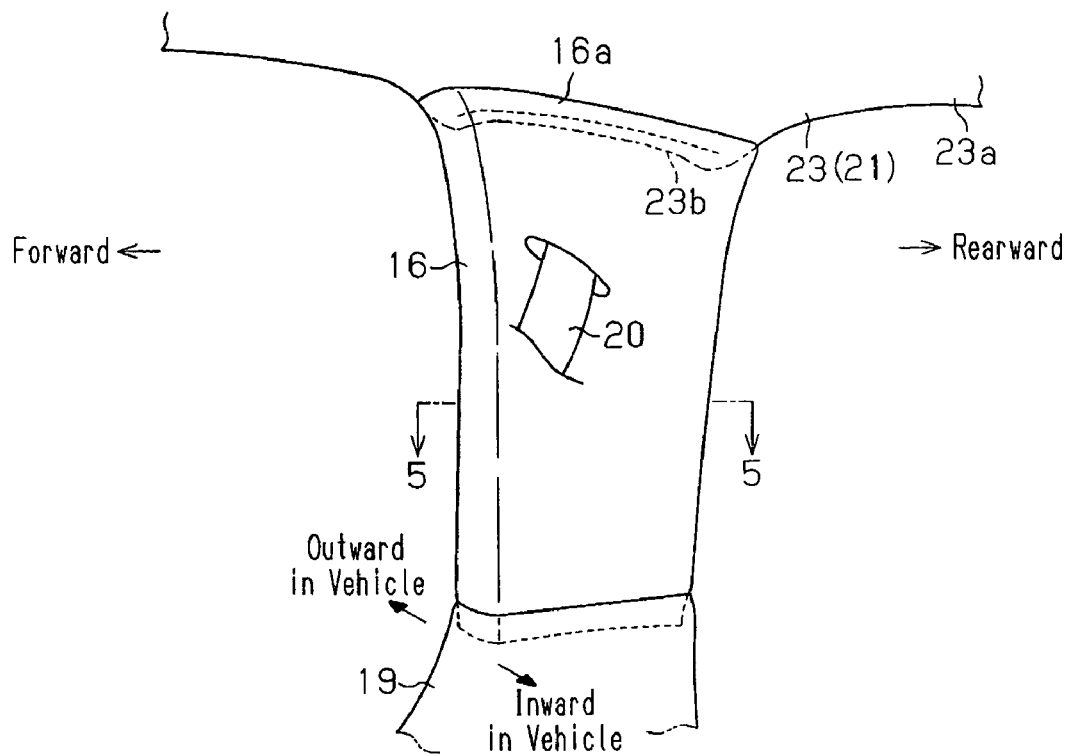
FIG. 4 is a perspective view illustrating a rear pillar garnish and the surrounding structure of the vehicle of FIG. 1, as viewed from the inside of the passenger compartment.
Figure 5:
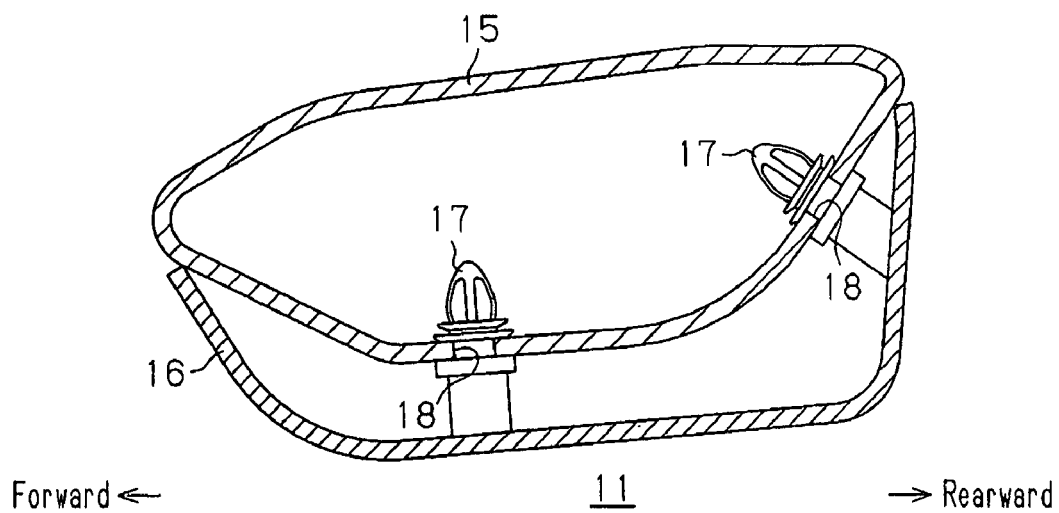
FIG. 5 is a cross-sectional view taken along line 5-5 in FIG. 4.

As shown in FIGS. 4 and 5, a surface of each rear pillar 15 that faces the passenger compartment 11 is covered with a rear pillar garnish 16. Fasteners 17 are provided on a surface of each rear pillar garnish 16 that faces the corresponding rear pillar 15, and fastener holes 18 are provided in the rear pillar 15. Each rear pillar garnish 16 is engaged with the corresponding rear pillar 15 by inserting the fasteners 17 into the fastener holes 18. The rear pillar garnishes 16 thus engaged with the rear pillars 15 are tilted in such a manner that the distance between the garnishes 16 increases from the upper ends toward the lower ends, like the rear pillars 15 (refer to FIG. 7).

The shape of the space in a rear portion of the passenger compartment 11 is defined by the rear pillar garnishes 16. That is, since the rear pillar garnishes 16 are inclined as described above, the space in a rear portion of the passenger compartment 11 is substantially in a trapezoidal shape with its width increasing from the top to the bottom.

A lower garnish 19 is arranged below each rear pillar garnish 16. Reference numeral 20 in FIG. 4 represents a seatbelt for restraining the occupant P seated on the rear seat 12.

A roof 21 of the vehicle 10 is located above the rear pillars 15 and the rear pillar garnishes 16. As shown in FIG. 6, a rear portion of the roof 21 has a roof panel 22, which is an exterior part, a rear roof headlining 23, which is an ornamental part, and an inner panel 24. The roof panel 22 is formed, for example, of a steel plate. The rear roof headlining 23 is formed, for example, of a flexible material such as a synthetic resin. A rear end 22a of the roof panel 22 is bent to be located below the remaining portion of the roof panel 22.

A rear door 25 is attached to the roof panel rear end 22a with a hinge mechanism 26. A rear window 27, which is substantially in a trapezoidal shape with its width increasing from the top to the bottom, is provide in an upper half of the rear door 25 (see FIG. 2). A rear window glass 28 is attached to the rear window 27.

As shown in FIG. 7, the rear roof headlining 23 is located above upper ends 16a of the rear pillar garnishes 16, and covers the rear portion of the roof panel 22 (see FIG. 6) from below. Left and right edges 23b of the rear roof headlining 23 are each located outside of the upper end 16a of the corresponding rear pillar garnish 16 with respect to the vehicle width direction.

As shown in FIG. 6, the inner panel 24 is located between the rear portion of the roof panel 22 and the rear roof headlining 23, and fixed to the roof panel 22 at least at a front end 24b and a rear end 24a.

A weatherstrip 29 for sealing is attached to the rear end 22a of the roof panel 22 and the rear end 24a of the inner panel 24. Engaging pieces 29a extend downward from the rear of the weatherstrip 29. The rear end 23a of the rear roof headlining 23 is engaged with the engaging pieces 29a. The engagement strength between the roof panel 22 and the rear roof headlining 23 by means of the engaging pieces 29a is determined such that the roof panel 22 and the roof headlining 23 are disengaged when an airbag 32 (discussed below) is inflated and pushes the rear roof headlining 23 downward.

An inflator 31 and the airbag 32, which is inflated and deployed when receiving gas from the inflator 31, are arranged in a space between the roof panel 22 and the rear roof headlining 23 and between the upper ends 16a of the rear pillar garnishes 16. The inflator 31 and the airbag 32 form a main portion of the rear-impact airbag apparatus. The airbag 32 is accommodated in an accommodation portion 33 between the roof panel 22 and the rear roof headlining 23 in a compact state suitable for accommodation, that is, a shape for accommodation.

When a rear impact is applied to the vehicle 10, the inflator 31 ejects gas. The airbag 32 is supplied with gas from the inflator 31 and pops out of the accommodation portion 33. The airbag 32 is then inflated and deployed between the rear seats 12 and the rear window glass 28. The inflated and deployed airbag 32 protects the occupant P seated on the rear seats 12, particularly the head Ph of the occupant P (see FIG. 1).

The inflator 31 has a columnar shape and is elongated along the vehicle width direction. The inflator 31 is fixed to the front end 24b of the inner panel 24. The inflator 31 generates gas by means of combustion reaction of a gas generating agent. Alternatively, the inflator 31 may have a compressed gas cylinder filled with high pressure gas. In this case, a wall of the gas cylinder is broken with explosive to discharge the high pressure gas.

The airbag 32 is formed by sewing fabric sheets 34 (see FIG. 8) made of a foldable material with high strength and flexibility such as woven fabric. The inflated and deployed airbag 32 is substantially in a trapezoidal shape with its dimension W along the vehicle width direction (see FIG. 8) increasing from the top to the bottom, so that the airbag 32 covers the entire rear window glass 28.

As shown in FIG. 8, a gas supply portion 35 having a supply port 35a is provided in a center of an upper base 32a of the airbag 32. The gas supply portion 35 is connected to the inflator 31.

Attachment pieces 36 are formed in the upper base 32a. The attachment pieces 36 may be formed integrally with the airbag 32. Alternatively, the attachment pieces 36 may be formed separately from the airbag 32 and may be integrated with the airbag 32 after being formed. Plates 37 made of a high-strength material such as metal are attached to front and back sides of each attachment piece 36. Each pair of the plates 37 are coupled to each other, for example, through crimping with the corresponding the attachment piece 36 held in between.

Through sewing of the fabric sheets 34, a single lateral inflatable cell 41, a pair of left and right vertical inflatable cells 42, 46, and three center vertical inflatable cells 43, 44, 45 are defined inside the airbag 32. These inflatable cells 41 to 46 are inflated when receiving gas from the inflator 31.

The lateral inflatable cell 41 guides gas to flow outward from the inflator 31 along the vehicle width direction. The lateral inflatable cell 41 extends along the upper base 32a of the airbag 32 in the vehicle width direction. A center portion of the lateral inflatable cell 41 in the vehicle width direction is connected to the gas supply portion 35.

The center vertical inflatable cells 43 to 45 are inflated below the lateral inflatable cell 41 to form a center portion of the airbag 32. The vertical inflatable cells 43 to 45 are lined up along the vehicle width direction. Although the vertical inflatable cells 43 to 45 communicate with the lateral inflatable cell 41, no adjacent pair of the vertical inflatable cells 43 to 45 are connected to each other.

The left and right inflatable cells 42, 46 each guide gas flowing therein to flow substantially downward from the corresponding end of the lateral inflatable cell 41. The vertical inflatable cells 42, 46 form left and right portions of the inflated and deployed airbag 32. The vertical inflatable cells 42, 46 extend slantingly from the ends of the lateral inflatable cell 41 such that the space between the cells 42, 46 gradually increases from the top to the bottom. That is, the vertical inflatable cells 42, 46 extend in a direction intersecting the vehicle width direction. Each of the vertical inflatable cells 42, 46 communicates with the lateral inflatable cell 41.

The cross-sectional area of gas flowing path at a boundary 47 between the lateral inflatable cell 41 and each of the left and right vertical inflatable cells 42, 46 will hereafter be represented by S1. The cross-sectional area of gas flowing path in the lateral inflatable cell 41, more precisely, the cross-sectional area of gas flowing path in the lateral inflatable cell 41 except for the sections to which the center vertical inflatable cells 43 to 45 are connected, will hereafter be represented by S2. Further, the cross-sectional area of gas flowing path in each of the left and right vertical inflatable cells 42, 46 will hereafter be represented by S3. When the lateral inflatable cell 41 and the vertical inflatable cells 42, 46 are inflated, the gas flowing path cross-sectional areas S1 to S3 satisfy the inequality S1>S3 as well as the inequality S1>S2. That is, the gas flowing path cross-sectional area S1 of the boundary between the lateral inflatable cell 41 and each of the left and right vertical inflatable cells 42, 46 is greater than the gas flowing path cross-sectional area S2 of the lateral inflatable cell 41, and is greater than the gas flowing path cross-sectional area S3 of each of the left and right vertical inflatable cells 42, 46.

In the airbag 32, a portion that is located at a position lower than the lateral inflatable cell 41 and between the left vertical inflatable cell 42 and the center vertical inflatable cells 43 to 45 forms a non-inflatable portion 48, which is not supplied with the gas from the inflator 31. Likewise, a portion that is located at a position lower than the lateral inflatable cell 41 and between the center vertical inflatable cells 43 to 45 and the right vertical inflatable cell 46 forms a non-inflatable portion 49, which is not supplied with the gas from the inflator 31. When the airbag 32 is inflated and deployed, each of the non-inflatable portions 48, 49 is located between the headrest 14 of the corresponding rear seat 12 and the rear window glass 28 (refer to FIG. 3).

The shapes and positions of the center vertical inflatable cells 43 to 45 may be changed as necessary.

An inner tube 51 is provided in the airbag 32 to guide the gas from the inflator 31 to flow in specific directions. Like the airbag 32, the inner tube 51 is formed by sewing one or two fabric sheets 52 made of woven fabric.

The inner tube 51 has an inlet portion 53 located in the gas supply portion 35 of the airbag 32, and a guide portion 54 located in the lateral inflatable cell 41 of the airbag 32. An end of the inlet portion 53 that corresponds to the supply port 35a of the gas supply portion 35 is open. Through this opening, the inflator 31 is inserted into the inlet portion 53. The gas supply portion 35 and the inlet portion 53 are hermetically fastened to the inflator 31 by an annular fastener (not shown) attached from the outside. The guide portion 54 extends straight along the vehicle width direction. The guide portion 54 communicates with the inlet portion 53 at the center of the guide portion 54 in the vehicle width direction. An outlet port 55 is formed at each of both ends of the guide portion 54 in the vehicle width direction. An outlet hole 56, which has a smaller opening area than that of the outlet port 55, is formed at a position below the center of the guide portion 54 in the vehicle width direction. The outlet hole 56 is located above the center vertical inflatable cell 44.

Before being inflated and deployed, the airbag 32 is folded into the shape for accommodation as shown in FIGS. 7A and 7B. When folding the airbag 32, the airbag 32 is progressively folded at folding lines 62a, 62b, 62c, 62d, 62e shown in FIG. 9A from a lower base 32b toward the upper base 32a, so that a volute portion 63 (see FIG. 6) having a volute cross-section. Next, the airbag 32 is folded at a folding line 62f defined on the lateral inflatable cell 41 in a direction opposite to the folding direction of the folding lines 62a to 62e, so that a bellows portion 64 is formed between the upper base 32a and the volute portion 63 of the airbag 32 (see FIG. 6). As the lateral inflatable cell 41 is folded in half at the folding line 62f, the inner tube 51 is also folded in half. More specifically, the guide portion 54 of the inner tube 51 is folded so that an upper portion 54a, which communicates with the inlet portion 53, and a lower portion 54b, which has the outlet hole 56, overlap each other.

Figure 10:
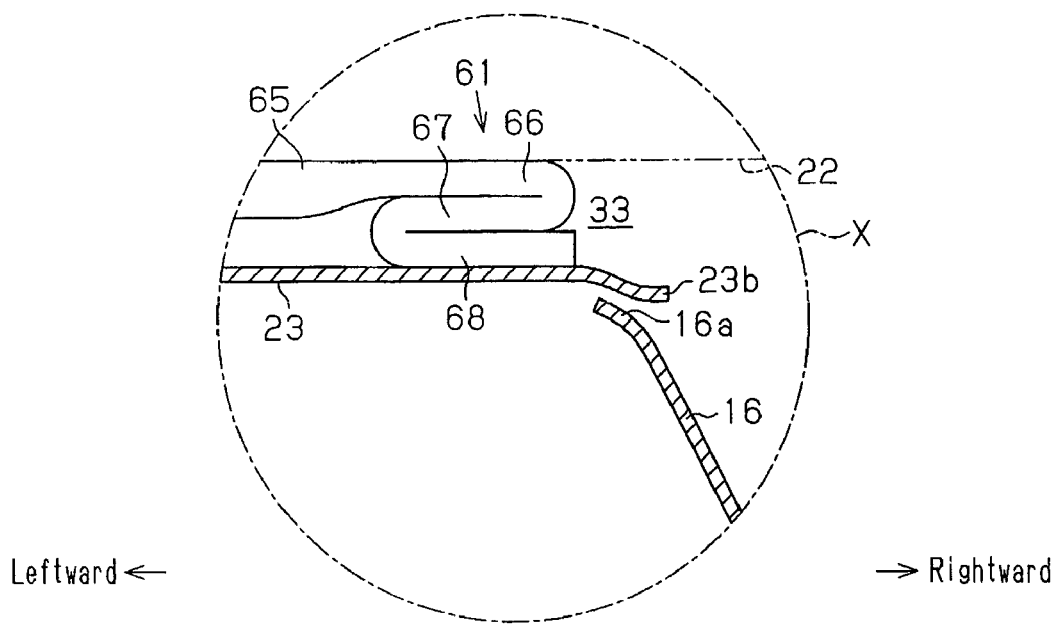
FIG. 10 is an enlarged view of area X of FIG. 7B, showing a folded and layered portion of the airbag when the airbag is folded into the shape for accommodation.

In this manner, the airbag 32 is folded to form the volute portion 63 and the bellows portion 64. As a result, a folded intermediate body 65 shown in FIG. 9B is formed. The length L of the folded intermediate body 65 along the vehicle width direction is the maximum possible length, and is equal to the maximum dimension W of the airbag 32 along the vehicle width direction shown in FIG. 8. Since the length L is greater than the distance D between the upper ends 16a of the rear pillar garnish 16 shown in FIG. 7B, it is impossible to accommodate the folded intermediate body 65 in the accommodation portion 33, which has the same width as the dimension of the distance D, as it is. Thus, as shown in FIGS. 7B and 10, both ends of the folded intermediate body 65 in the vehicle width direction are folded and layered to form folded and layered portions 61. The length L along the vehicle width direction of the airbag 32, which has been folded into the shape for accommodation, is slightly less than the dimension of the distance D between the upper ends 16a of the rear pillar garnish 16, and thus can be accommodated in the accommodation portion 33. Each folded and layered portion 61 includes a three layers, or an upper layer 66, a middle layer 67, and a lower layer 68, which are formed by folding both ends 69 in a bellows like manner. Each of the boundaries 47 between the lateral inflatable cell 41 and the left and right vertical inflatable cells 42, 46 is located in the corresponding folded and layered portion 61.

The procedure for forming the folded and layered portions 61 will now be described. First, the folded intermediate body 65 is folded at a valley fold line 71 and a mountain fold line 72 defined in each end 69 shown in FIG. 9B. Either the valley fold or the mountain fold may be performed first. The valley fold lines 71 and the mountain fold lines 72 extend perpendicularly to the longitudinal direction of the folded intermediate body 65. In each end 69 of the folded intermediate body 65, the mountain fold line 72 is located inside of the valley fold line 71. The folded and layered portions 61 are axisymmetrical with respect to the vehicle width direction.

After folded into the shape for accommodation as described above, the airbag 32 is bound by using, for example, binding tape at positions that include at least positions corresponding to the folded and layered portions 61. Then, the airbag 32 is arranged in the accommodation portion 33 on the rear roof headlining 23 in such manner that the folded and layered portions 61 are at lower ends, and that the folded and layered portions 61 are each located in the vicinity of the corresponding one of the left and right edges 28b of the rear roof headlining 23. By arranging the airbag 32 as shown above, the boundaries 47 between the lateral inflatable cell 41 and the left and right vertical inflatable cells 42, 46 are each located in the vicinity of the corresponding one of the left and right edges 23b of the rear roof headlining 23.

Thereafter, the airbag 32 is attached to the inner panel 24 at the attachment pieces 36 by using bolts 73 and nuts 74 as shown in FIG. 6.

The rear-impact airbag apparatus according to the present embodiment further includes a sensor 81 and a controller 82 as shown in FIGS. 1 and 2. The sensor 81 detects a rear impact applied to the vehicle 10. The controller 82 controls the operation of the inflator 31 based on a detection signal from the sensor 81. When the sensor 81 detects that a rear impact, the magnitude of which is equal to or greater than a predetermined value, is applied to the vehicle 10, the controller 82 outputs a drive current to the inflator 31. The gas generating agent in the inflator 31 is heated based on the drive current, which generates gas.

The gas generated in the inflator 31 is first supplied to the inlet portion 53 of the inner tube 51 as shown by arrows in FIG. 7A. As the inlet portion 53 is inflated by the supplied gas, the gas supply portion 35 of the airbag 32, which is located outside of the inlet portion 53, is also inflated. At least some of the gas supplied to the inlet portion 53 passes through the inlet portion 53, and is supplied to the guide portion 54 (the upper portion 54a of the guide portion 54). As a result, the lateral inflatable cell 41 of the airbag 32 starts being inflated, thereby subsequently breaking the binding tape binding the airbag 32. As the lateral inflatable cell 41 is inflated, the airbag 32 presses the rear roof headlining 23 downward.

Figure 11:
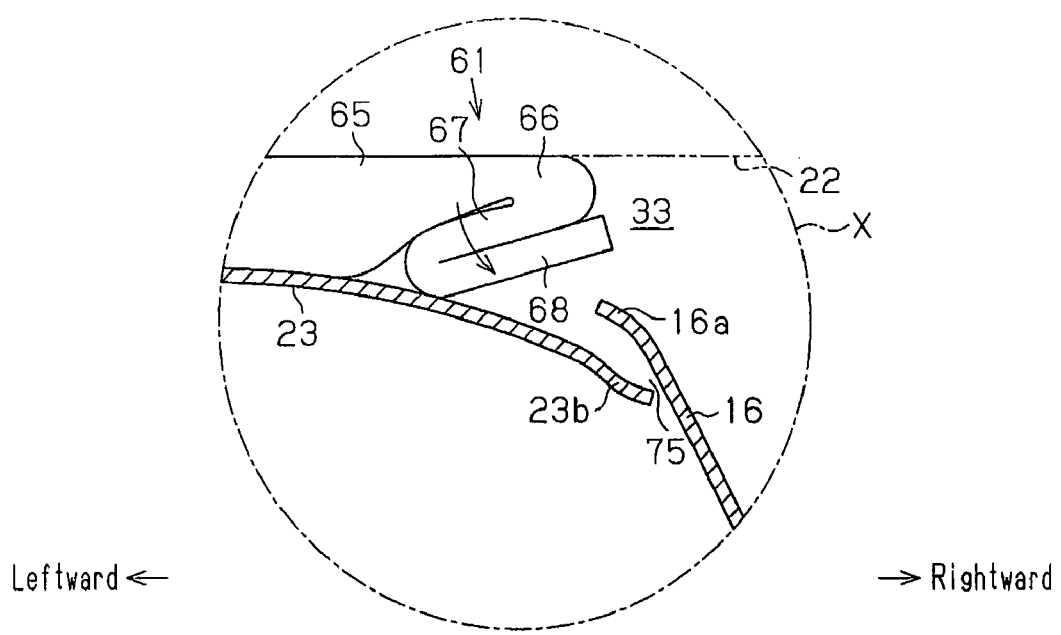
FIGS. 11 and 12 are diagrammatic views showing the operation of the folded and layered portion of the airbag during the inflation and deployment.

At least some of the gas supplied to the guide portion 54 flows into the lateral inflatable cell 41 through the outlet ports 55. Since the gas flowing path cross-sectional area S2 of the lateral inflatable cell 41 is relatively small, the speed of the gas passing through the lateral inflatable cell 41 is relatively fast. This is effective for quickly inflating and deploying the lateral inflatable cell 41. As gas flows into the lateral inflatable cell 41, the folded and layered portions 61 are unfolded. At this time, gas flows into the upper layer 66 as shown in FIG. 11 in each folded and layered portions 61. As a result, the middle layer 67 and the lower layer 68 are pressed downward and displaced to trace a path along a downward arc about the fold line between the upper layer 66 and the middle layer 67. In this process, the binding tape binding the folded and layered portions 61 are eventually broken.

When the middle layer 67 and the lower layer 68 of each folded and layered portion 61 are displaced to trace an arcuate path, the corresponding one of the left and right edges 23b of the rear roof headlining 23 is pressed downward. As a result, the headlining edges 23b are flexed downward. Eventually, as shown in FIG. 11, each headlining edge 23b gets over the upper end 16a of the corresponding rear pillar garnish 16, so that the headlining edge 23b is located below the garnish upper end 16a.

Figure 12:
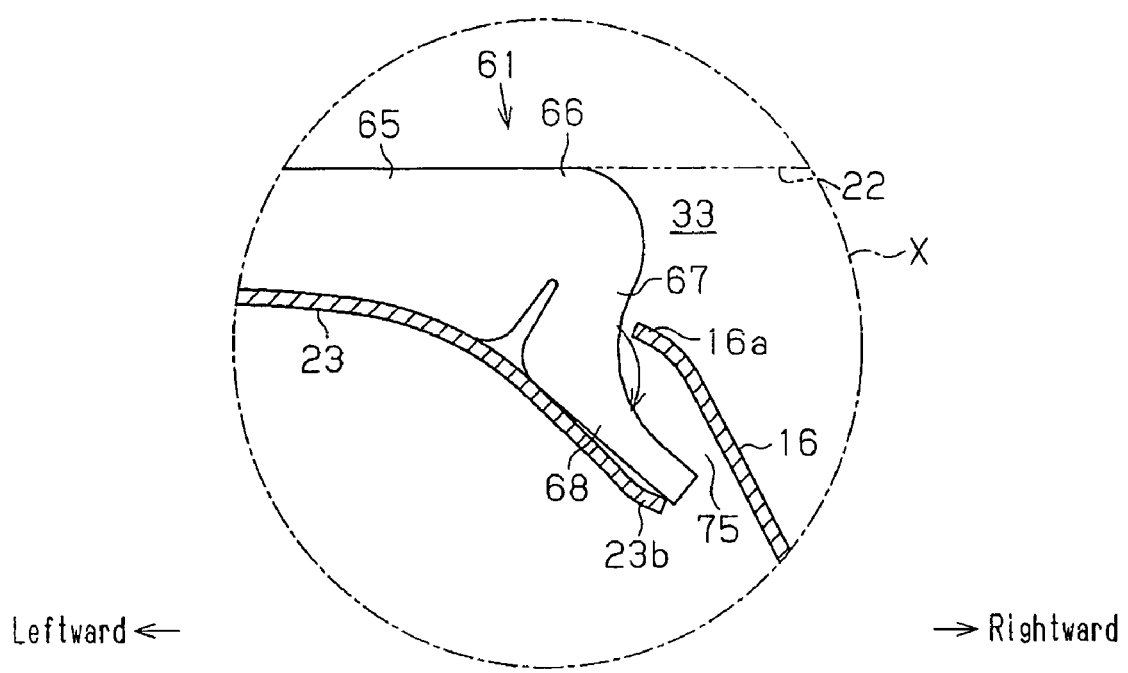

Further, gas flowing to the middle layer 67 of each folded and layered portion 61 applies a downward pressing force to the lower layer 68. As a result, as shown in FIG. 12, the lower layer 68 is displaced to trace a path of a downward arc about the fold line between the middle layer 67 and the lower layer 68. In this process, a gap 75 is created between the headlining edge 23b and the garnish upper end 16a. The gap 75 is increased as unfolding of the folded and layered portion 61 progresses. The unfolded folded and layered portions 61 extends into the space below the rear roof headlining 23 through the gap 75.

In the present embodiment, the airbag 32, which is folded into the shape for accommodation, is arranged in the accommodation portion 33 in such a manner that the boundaries 47 between the lateral inflatable cell 41 and the left and right vertical inflatable cells 42, 46 are each located in the vicinity of the corresponding one of the left and right edges 23b of the rear roof headlining 23. Since the gas flowing path cross-sectional area S1 of the boundary 47 between the lateral inflatable cell 41 and each of the left and right vertical inflatable cells 42, 46 is relatively large, the volume of each boundary 47 is relatively large so that the boundary 47 is relatively largely inflated. Therefore, as the airbag 32 is inflated, the headlining edges 23b are pressed downward by a relatively great force. Thus, each unfolded folded and layered portion 61 reliably extends into the space below the rear roof headlining 23 through the gap 75 between the headlining edge 23b and the garnish upper end 16a.

As the unfolding of the folded and layered portions 61 progresses, the left and right vertical inflatable cells 42, 46 start being inflated. A gas flow directed outward in the vehicle width direction is conducted to the lateral inflatable cell 41, while a substantially downward gas flow is conducted into each of the left and right vertical inflatable cells 42, 46. Thus, the direction of the gas flow is greatly changed at the boundary 47 between the lateral inflatable cell 41 and each of the left and right vertical inflatable cells 42, 46. However, since the gas flowing path cross-sectional area S1 of each boundary 47 is greater than the gas flowing path cross-sectional area S2 of the lateral inflatable cell 41, the flow resistance of gas through the boundary 47 is prevented from being increased, so that the gas in the lateral inflatable cell 41 smoothly flows to the left and right vertical inflatable cells 42, 46 through the boundaries 47.

The gas flowing path cross-sectional area S3 of each of the left and right vertical inflatable cells 42, 46 is smaller than the gas flowing path cross-sectional area S1 of the corresponding boundary 47. Thus, the speed of gas passing through the left and right vertical inflatable cells 42, 46 is relatively high. This is effective for quickly inflating and deploying the left and right vertical inflatable cells 42, 46.

As described above, the folded and layered portions 61 are axisymmetrical with respect to the vehicle width direction. That is, the folded and layered portions 61 are bilaterally symmetrical. Thus, the folded and layered portions 61, 61 are unfolded at the same time.

As the unfolding of the folded and layered portions 61 progresses, the folded portions at the fold line 62f on the lateral inflatable cell 41 are eventually unfolded. As a result, the gas in the inner tube 51 flows out not only through the outlet ports 55, but also through the outlet hole 56 provided in the lower portion 54b of the guide portion 54. At least some of the gas flowing out through the outlet hole 56 flows into the center vertical inflatable cells 43 to 45 as shown by arrows in FIG. 8. Also, some of the gas flowing out through each outlet port 55 flows into the corresponding one of the center left vertical inflatable cell 43 and the center right vertical inflatable cell 45. As a result, the bellows portion 64 and the volute portion 63 of the airbag 32 are unfolded.

As the unfolding of the bellows portion 64 and the volute portion 63 progresses, the downward force applied to the rear roof headlining 23 by the airbag 32 increases. Eventually, the engagement between the roof panel 22 and the rear roof headlining 23 by the engaging pieces 29a is cancelled, and the rear roof headlining 23 is flexed downward as shown by alternate long and two short dashes lines in FIG. 6. As a result, an opening 76 is formed between the rear end 23a of the rear roof headlining 23 and the inner panel 24. After the bellows portion 64 and the volute portion 63 are unfolded, the airbag 32 extends downward through the opening 76, and is inflated and deployed along the rear window glass 28 and between the rear seats 12 and the rear window glass 28.

In the inflated and deployed airbag 32, the inflated center vertical inflatable cells 43 to 45 are located between the headrests 14 of the left and right rear seats 12, and the inflated left and right vertical inflatable cells 42, 46 are each located outside of the corresponding headrest 14 with respect to the vehicle width direction. Each of the non-inflatable portions 48, 49 is located rearward of the corresponding headrest 14. Among the vertical inflatable cells 43 to 45, the inflation and deployment of the centermost vertical inflatable cell 44 are completed slightly prior to those of the center left and center right vertical inflatable cells 43, 45. The inflation and deployment of the left and right vertical inflatable cells 42, 46 are completed substantially at same time as the completion of the inflation and deployment of the center vertical inflatable cells 43 to 45. When the inflation and deployment of the airbag 32 as whole are completed, the airbag 32 is substantially in a trapezoidal shape that conforms to the shape of the space in the rear of the passenger compartment 11 defined by the pillar garnishes 16, and substantially covers the entire rear window glass 28.

As the entire airbag 32 completely inflated and deployed, the head Ph of the occupant P seated on a rear seat 12 is separated from the rear window glass 28 by the airbag 32 (see alternate long and two short dashes lines in FIG. 1). Therefore, the airbag 32 not only protects the occupant P from a rear impact applied to the vehicle 10, but also prevents broken pieces of the rear window glass 28 from entering the passenger compartment 11 and prevents any object from entering the passenger compartment 11 through the rear window 27 when the rear window glass 28 is broken. Also, the airbag 32 prevents the body of the occupant P from being shifted rearward due to the rear impact applied to the vehicle 10.

The preferred embodiment has the following advantages.

The gas flowing path cross-sectional area S2 of the lateral inflatable cell 41 is smaller than the gas flowing path cross-sectional area 31 of the boundary 47 between the lateral inflatable cell 41 and each of the left and right vertical inflatable cells 42, 46. Since the gas flowing path cross-sectional area S2 of the lateral inflatable cell 41 is relatively small, the speed of the gas passing through the lateral inflatable cell 41 is relatively fast. Therefore, the lateral inflatable cell 41 is relatively quickly inflated and deployed.

The gas flowing path cross-sectional area S1 of the boundary 47 between the lateral inflatable cell 41 and each of the left and right vertical inflatable cells 42, 46 is larger than the gas flowing path cross-sectional area S2 of the lateral inflatable cell 41. Therefore, although the direction of the gas flow is greatly changed at the boundaries 47, the flow resistance of gas through the boundaries 47 is prevented from being increased, so that the gas in the lateral inflatable cell 41 smoothly flows to the left and right vertical inflatable cells 42, 46 through the boundaries 47. As a result, the inflation and deployment of the left and right vertical inflatable cells 42, 46 are not delayed, and the airbag 32 evenly inflated and deployed.

The gas flowing path cross-sectional area S3 of each of the left and right vertical inflatable cells 42, 46 is smaller than the gas flowing path cross-sectional area S1 of the corresponding boundary 47. Thus, the speed of gas passing through the left and right vertical inflatable cells 42, 46 is relatively high. Therefore, the left and right vertical inflatable cells 42 are relatively quickly inflated and deployed.

The maximum dimension W of the airbag 32 in the vehicle width direction shown in FIG. 8 is greater than the width of the accommodation portion 33 provided between the roof panel 22 and the rear roof headlining 23. However, the airbag 32 is folded into the shape for accommodation as shown in FIGS. 7A and 7B and reliably accommodated in the accommodation portion 33.

When the airbag 32 is folded into the shape for accommodation, each of the boundaries 47 between the lateral inflatable cell 41 and the left and right vertical inflatable cells 42, 46 is located in the corresponding folded and layered portion 61. Since the gas flowing path cross-sectional area S1 of each of the boundaries 47 is relatively large, the volume of each boundary 47 is relatively large so that the boundary 47 is relatively largely inflated. This promotes the unfolding of the folded and layered portions 61. Particularly, in the present embodiment, the airbag 32, which is folded into the shape for accommodation, is arranged in the accommodation portion 33 in such a manner that the boundaries 47 are each located in the vicinity of the corresponding one of the left and right edges 23b of the rear roof headlining 23. Therefore, since the boundaries 47 are relatively largely inflated, the headlining edges 23b are pressed downward by a relatively great force. Thus, each unfolded folded and layered portion 61 reliably extends into the space below the rear roof headlining 23 through the gap 75 between the headlining edge 23b and the garnish upper end 16a.

The airbag 32 is folded to be bilaterally symmetrical. The airbag 32 is supplied with gas from the inflator 31 through the gas supply portion 35 provided in the center of the upper base 32a. Thus, the inflation and the deployment of the airbag 32 progress in a bilaterally symmetrical manner with the folded and layered portions 61, 61 unfolded at the same time. This is effective for uniformly inflating and deploying the airbag 32.

The above described embodiment may be modified as follows.

The airbag 32 may be formed into a shape for accommodation different from that in the illustrated embodiment. For example, the folded and layered portion 61 may be provided only in one of the ends 69 of the folded intermediate body 65, and the folded and layered portion 61 in the other end 69 may be omitted. Alternatively, folded and layered portions may be provided in portions of the folded intermediate body 65 other than the ends 69. Further, instead of folding the ends 69 of the folded intermediate body 65 in a bellows like manner, the folded and layered portions 61 may be formed to have volute cross sections. Although, in the illustrated embodiment, the number of folding back of each folded and layered portion 61 is two, the number of folding may be changed.

The gas supply portion 35 does not necessarily need to be located in the exact center of the airbag 32 in the vehicle width direction, but may be slightly displaced from the center.

The folded and layered portions 61 do not necessarily need to be axisymmetrical with respect to the vehicle width direction.

The airbag 32 folded in the shape for accommodation does not necessarily need to have the volute portion 63. That is, instead of rolling the airbag 32 to form the volute portion 63, the entire airbag 32 may be folded in a bellows like manner.

A guide shaft may be provided in the vicinity of each rear pillar 15, and a strap may be attached to each of the left lower portion and the right lower portion of the airbag 32 in the inflated and deployed state. A guide ring may be attached to each strap and loosely fitted to the corresponding guide shaft. In this case, when the airbag 32 is inflated and deployed, the guide rings move downward from the upper portions of the guide shafts while being guided along the guide shafts. This allows the airbag 32 to be deployed into an appropriate shape between the rear pillars 15.

The inner tube 51 provided inside the airbag 32 may be omitted.

The invention claimed is:

1. A rear-impact airbag apparatus for use in a vehicle, the apparatus comprising:
    an inflator that ejects gas in response to an impact applied to the vehicle from the rear; and
    an airbag accommodated in an accommodation portion formed in a rear portion of a roof of the vehicle, wherein,
        when supplied with gas from the inflator, the airbag pops out of the accommodation portion and is inflated and deployed, wherein
    a lateral inflatable cell, which guides gas from the inflator to flow outward in a width direction of the vehicle, and a vertical inflatable cell, which guides gas flowing therein from an end of the lateral inflatable cell to flow substantially downward, are defined in the airbag, wherein
    a gas flowing path cross-sectional area of a boundary between the lateral inflatable cell and the vertical inflatable cell is larger than a gas flowing path cross-sectional area of the lateral inflatable cell, wherein
    the inflated and deployed airbag has a shape the width of which increases from the top to the bottom, wherein,
    before being inflated and deployed, the airbag is accommodated in the accommodation portion in a folded up state, in which the airbag is folded along a vertical direction to form an intermediate body having an elongated shape and the intermediate body is then folded at a mountain fold line and a valley fold line defined in each end of the intermediate body, and wherein,
    prior to inflation and deployment of the airbag, the boundary is located in a folded and layered portion formed by mountain-and-valley-folding the ends of the intermediate body.

2. The apparatus according to claim 1, wherein
a gas flowing path cross-sectional area of the vertical inflatable cell is smaller than the gas flowing path cross-sectional area of the boundary.

3. The apparatus according to claim 1, wherein
the vehicle has a pair of rear pillar garnishes and a rear roof headlining, wherein
the rear pillar garnishes are separated from each other in the vehicle width direction and extend slantingly such that the space between the pillar garnishes increases from the top to the bottom, wherein
the rear roof headlining is located above upper ends of the rear pillar garnishes, wherein
both edges of the rear roof headlining in the vehicle width direction are each located outside of the upper end of the corresponding rear pillar garnish, wherein
the accommodation portion is formed above the rear roof headlining, and wherein,
before being inflated and deployed, the airbag is accommodated in the accommodation portion such that each folded and layered portion is located in the vicinity of a corresponding one of the edges of the rear roof headlining, whereby,
when the inflation and deployment of the airbag progress, each of the edges of the rear roof headlining is pressed downward as the corresponding folded and layered portion is unfolded.

* * * * *